(12) United States Patent  
Kesselman

(10) Patent No.: US 7,193,163 B1  
(45) Date of Patent: Mar. 20, 2007

(54) HANDHELD ELECTRONIC SCALE WITH BACKGROUND DIGITAL ANIMATION ON DISPLAY SCREEN

(76) Inventor: Joshua D. Kesselman, 2515 S. W. Marine Drive, Vancouver BC (CA) V6P 6C3

( * ) Notice: Subject to any disclaimer, the term of this patent is extended or adjusted under 35 U.S.C. 154(b) by 91 days.

(21) Appl. No.: 11/094,400

(22) Filed: Mar. 30, 2005

Related U.S. Application Data

(60) Provisional application No. 60/558,217, filed on Mar. 31, 2004.

(51) Int. Cl.
*G01G 19/414* (2006.01)
(52) U.S. Cl. .................. 177/25.13; 177/177; 345/473; 715/709; 702/173; 705/414
(58) Field of Classification Search ............ 177/25.13, 177/177; 345/473; 715/709; 702/173; 705/414
See application file for complete search history.

(56) References Cited

U.S. PATENT DOCUMENTS

| | | | |
|---|---|---|---|
| 4,041,289 A | 8/1977 | Brosh et al. ................ 702/173 |
| 4,041,818 A | 8/1977 | Rummer .................. 177/35.15 |
| 4,195,348 A | 3/1980 | Kakutani .................... 702/164 |
| 4,495,581 A | 1/1985 | Piccione .................... 705/402 |
| 4,800,973 A | 1/1989 | Angel ........................ 177/211 |
| 4,884,199 A * | 11/1989 | Boothroyd et al. ......... 715/709 |
| 5,261,041 A | 11/1993 | Susman ...................... 345/473 |
| 5,596,694 A * | 1/1997 | Capps ........................ 345/473 |
| 5,600,779 A * | 2/1997 | Palmer et al. .............. 715/709 |
| 6,013,878 A * | 1/2000 | Schwartz et al. ......... 177/25.13 |
| 6,064,387 A | 5/2000 | Canaday et al. ............ 715/839 |
| 6,153,835 A * | 11/2000 | Schwartz et al. ......... 177/25.13 |
| 6,177,929 B1 | 1/2001 | Maddalozzo, Jr. et al. . 715/762 |
| 6,295,198 B1 | 9/2001 | Loh et al. ................... 361/683 |
| 6,317,885 B1 | 11/2001 | Fries .......................... 725/109 |
| 6,354,996 B1 * | 3/2002 | Drinan et al. ............... 600/300 |
| 6,381,484 B1 | 4/2002 | Ayanruoh ................... 600/407 |
| 6,404,441 B1 | 6/2002 | Chailleux ................... 715/704 |
| 6,428,124 B1 * | 8/2002 | Bluth et al. ................. 312/194 |
| 6,498,948 B1 | 12/2002 | Ozawa et al. .............. 600/476 |
| 6,629,844 B1 | 10/2003 | Jenkins et al. ............. 434/169 |
| 6,657,643 B1 | 12/2003 | Horvitz et al. ............. 715/764 |
| 6,989,494 B2 * | 1/2006 | Yagioka et al. .......... 177/25.13 |
| 2002/0109736 A1 | 8/2002 | Chailleux |
| 2003/0168260 A1* | 9/2003 | Muyal |

* cited by examiner

*Primary Examiner*—Randy W. Gibson
(74) *Attorney, Agent, or Firm*—Christine Q. McLeod; Beusse Wolter Sanks; Mora & Maire

(57) ABSTRACT

The hand held scale of the present invention comprises a rectangular casing with a weighing platform, for supporting items to be weighed, a display screen, for displaying the weight of the objects and to view the animation sequences. There are a series of digital animations that are viewable on the display screen and each different animation sequence corresponds to a particular scale function or operation. The user is amused and entertained with animation when the scale is turned on, objects are weighed, the scale is turned off, reset as well as other functions.

15 Claims, 5 Drawing Sheets

HANDHELD ELECTRONIC SCALE WITH BACKGROUND DIGITAL ANIMATION ON DISPLAY SCREEN

This application claims priority to and incorporates by reference U.S. Provisional Application No. 60/558,217 filed Mar. 31, 2004.

FIELD OF THE INVENTION

The present invention relates to a scale which possesses a flat, compact and portable housing construction, and more specifically pertains to a scale capable of providing a digital display of an objects weight and has associated digital animations while basic functions are performed.

BACKGROUND OF THE INVENTION

There are a number of patents for scales including U.S. Pat. Nos. 4,034,818; 4,041,289; 4,195,348; 4,495,581; 4,800,973; 6,177,929; 6,295,198; and 6,381,484. Additionally, patents and patent application publications covering digital animation on a display screen include U.S. Pat. Nos. 6,657,643; 6,629,844; 6,498,948; 6,404,441; 6,317,885; 6,064,387; 5,261,041; and U.S. Patent Application Publication No US 2002/0109736.

Typically, with an electronic scale, an object is positioned on a weighing platform, where the weight of the object causes the weighing platform to move downward. The downward force causes the weighing platform to exert a force or pressure on a transducer. The transducer converts the downward force into an analog signal in terms of a voltage or a current having a magnitude, which varies according to the weight of the object.

This analog signal cannot be easily converted for digital display purposes without the use of an analog to digital converter (A/D converter). Essentially, the prior art shows many techniques for performing analog to digital conversion. Primarily, the object of such devices is to respond to an analog signal to provide therefrom a digital code or a digital signal, which can be processed by conventional digital circuitry to eventually activate a digital display, such that, the weight of the object is displayed on the display screen.

Furthermore, digital animation on a display screen, such as a computer monitor, has been used to educate, entertain, and amuse the user. The scope of the prior art does not include the use of digital animation strictly for the purpose of entertaining or amusing the users of everyday devices, such as handheld scales.

BRIEF SUMMARY OF THE INVENTION

The hand held scale of the present invention comprises a rectangular casing with a weighing platform, for supporting items to be weighed, a display screen, and the electronic components for controlling such. The scale is preferably an electronic scale, where downward forces on the weighing platform are sensed by a transducer which produces an electrical signal indicative of weight. The visual display also shows several animated sequences that initiate while the scale is performing basic operations, such as powering the handheld scale up and weighing an object.

In the present invention, the display screen is a multipurpose screen display which is controlled by a microprocessor and connected to a power source, where the operational modes include a weighing function and entertaining digital animation. For example, an animation sequence is launched and appears on the screen display when an object is placed on the weighing platform. Additionally, the hand held scale enables the weight of an object to be selectively displayed in a variety of units, including, grams, ounces, troy ounces, and pennyweight by depressing the MODE key.

In an embodiment, the hand held scale of the subject invention comprises an electronic scale and a display means for digitally displaying the weight of an object, wherein the scale and the display means are controlled by a microprocessor.

The display means of the subject invention is a digital screen that serves the dual purpose of entertaining or amusing the scale user and to displaying the object weight. The user is entertained by a series of animations that commence when the scale is operating. For example, when an object is placed on the scale for the weight to be determined, a short animation appears on the display screen to amuse the user until the value of the object's weight is displayed. Presently, the functions of powering the scale up, weighing an object, changing the unit of measure of the object's weight, resetting the hand-held scale, and turning the scale off each launch a different animation sequence for the user's enjoyment. The scale interacts with the user on the most fundamental level in that one animation sequence indicates to the user that the scale is ready and in the power off animation sequence, a closing is displayed.

Specifically, in an embodiment of the invention the electronic scale comprises a display screen for digitally displaying the weight of an object, a processing device for controlling the scale and the display screen, wherein the display screen displays animation during operation of the scale, the animation appearing momentarily in conjunction with certain functional operations of the scale, wherein the functional operations comprise weighing an object. The functional operations further comprise powering up, changing unit of measure, zero reset, powering down, and overload error notification.

A method for digitally displaying the weight of an object is also provided. The method includes displaying animation during operation of the scale, said animation appearing momentarily in conjunction with certain functional operations of the scale, wherein said functional operations comprise weighing an object. The functional operations further comprise powering up, changing unit of measure, zero reset, powering down, and overload error notification. Moreover, the functional operation of weighing an object includes displaying the weight in digits wherein the digits momentarily move prior to becoming stationary to display the weight. These digits momentarily move by increasing and decreasing the size of the digits in a repetitive fashion.

Other aspects and advantages of the invention will become apparent from the following detailed description taken in conjunction with the accompanying drawings, illustrating, by way of example, the principles of the invention.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 3A–3F depict the display screen animation of the sample digital scale when turned on.

DETAILED DISCLOSURE OF THE INVENTION

Figure 1A:
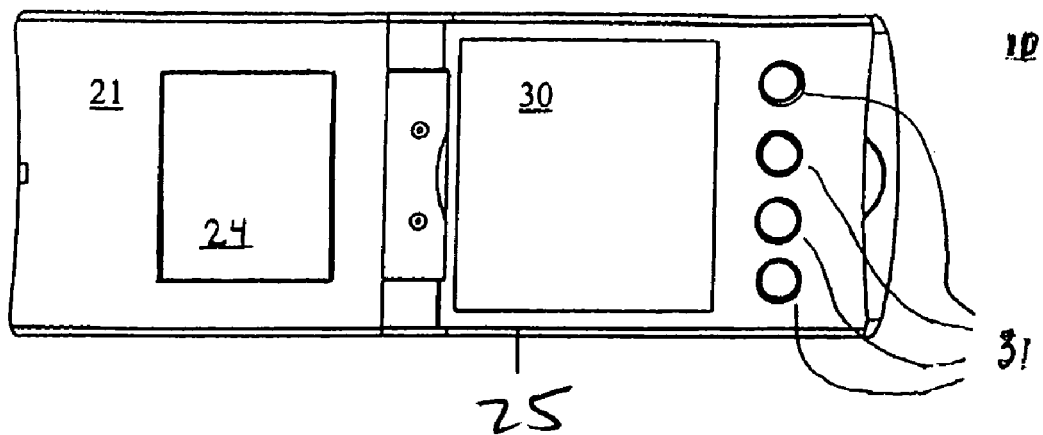
FIG. 1A depicts a top view of the sample digital scale.
Figure 1B:
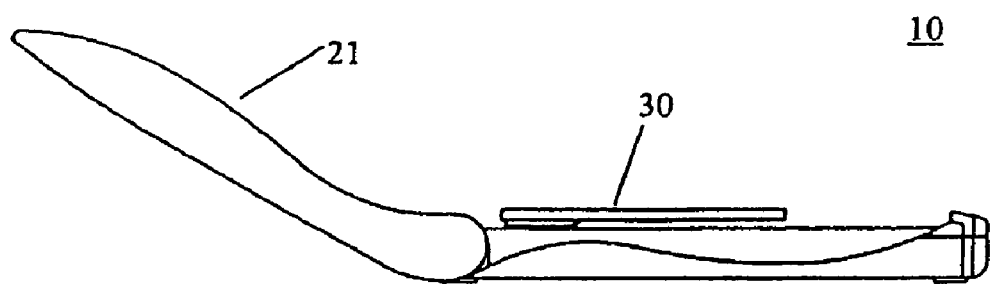
FIG. 1B depicts a side view of the sample digital scale.
Figure 1C:
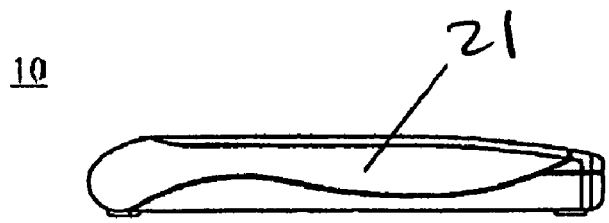
FIG. 1C depicts a side view of the sample digital scale in a closed position.
Figure 1D:
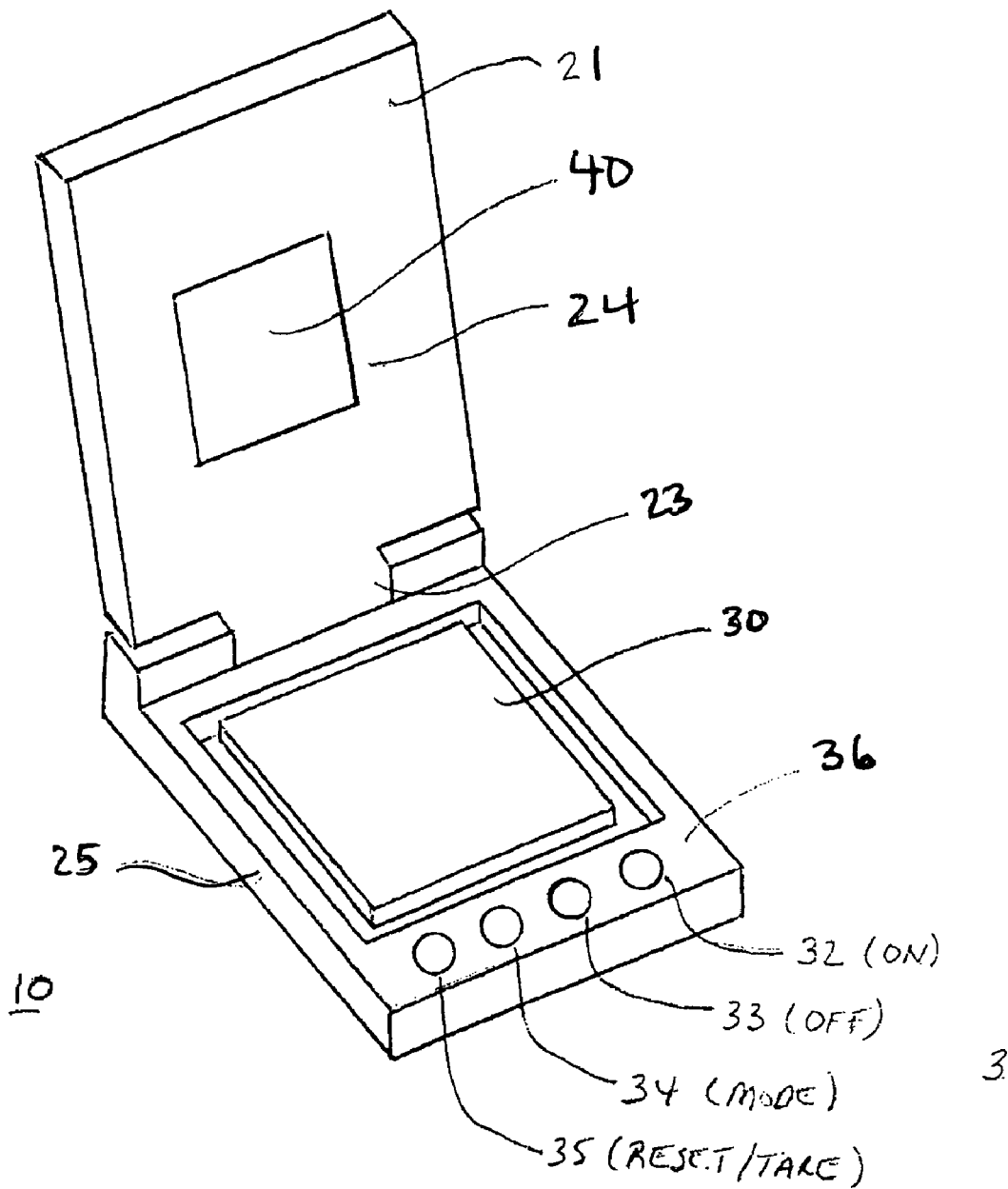
FIG. 1D depicts an isometric view of the sample digital scale.

With reference to FIGS. 1A–1D, the hand held scale 10 of the present invention comprises a rectangular casing 20 comprising a weighing platform 30, for supporting items to be weighed, a display screen 24, for displaying the weight of the objects and background animation 40 for the scale 10, and the electronic components for controlling such. The scale 10 includes a hinged cover 21 that opens on hinges 23. The function keys 31 may be arranged as a matter of design choice. In the example provided, function keys 32–35 are shown located on the upper surface 36 of the bottom portion 25 of the hand held scale 10 near the weighing platform 30.

Figure 2:
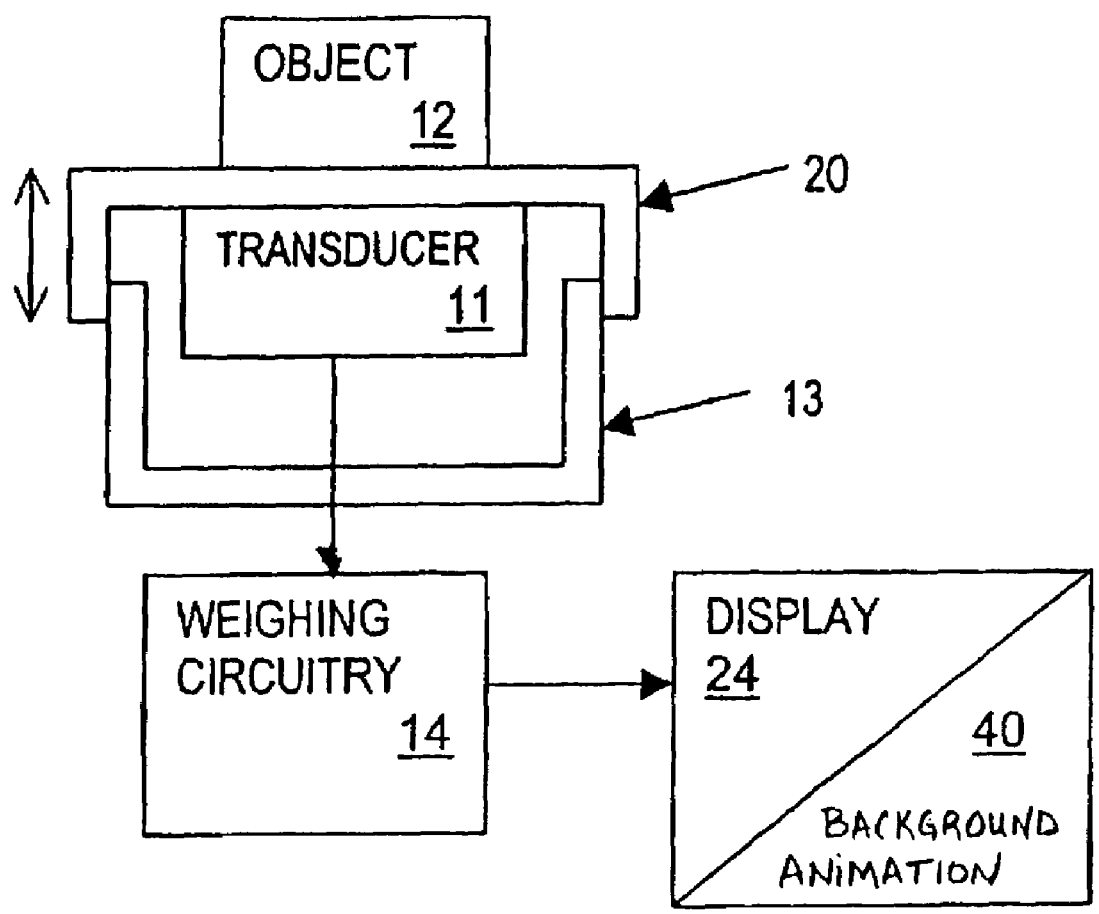
FIG. 2 depicts a block diagram of a sample digital scale.

An example of a simplified block diagram for an electronic scale is shown in FIG. 2, where the electronic components of the scale 10 are positioned within the rectangular case 20. The scale 10 is preferably an electronic scale 10. As shown, an object 12 is positioned on a weighing platform 30 where downward forces on the weighing platform 30 are sensed by a transducer 11 which produces an electrical signal indicative of weight. The weighing platform 30 is associated with a base member 13, which is positioned on a horizontal reference plane. The object 12 causes the weighing platform 30 to move perpendicular with respect to the plane or base 13. The perpendicular force of the weight of the object 12 causes the weighing platform 30 to exert a force or pressure on a transducer 11 coupled between the weighing platform 30 and the base 13. The background animation 40 becomes active while the weight of the object 12 is being determined. Additional background animation 40 is active when the electronic scale 10 is turned on, turned off, reset, and the unit of measure is changed. The weighing platform 30 and base member 13 are conventional scale components and many examples of suitable apparatus exist in the prior art and may be used herein.

The transducer 11 or load cell can be a number of different devices for converting a pressure or a force into an electrical signal as known in the art. As such, the transducer 11 may comprise a Wheatstone bridge configuration employing piezoresistive elements or other pressure converting devices to provide a varying electrical signal indicative of the weight of the object 12 on the weighing platform 30. As such, the transducer 11 supplies an analog signal in terms of a voltage or a current having a magnitude which varies according to the weight of the object 12.

This analog signal cannot be easily converted for digital display purposes without the use of an analog to digital converter (A/D converter). Essentially, the prior art shows many techniques for performing analog to digital conversion, any of which may be used herein. Such devices respond to an analog signal to provide a digital code or a digital signal, which can be processed by conventional digital circuitry to eventually activate a digital display, such that, the weight of the object 12 is displayed on the display screen 24.

Referring to FIGS. 3A–3F, when the electronic scale 10 is turned on, an animation sequence 40a–40f is displayed on the display screen 24. After the start-up animation sequence 40a–40f is complete, the final image 40f in the animation sequence 40a–40f will remain static on the screen to indicate that the electronic scale 10 is ready for use. This sequence includes, for example, the words DIGITAL SCALE momentarily moving across the display screen followed by READY. Then a graphic representation of a scale with an object thereon is displayed followed by "0.0" to signify the scale is zeroed and ready. The electronic scale 10 will remain on until turned off or will automatically turn off after a specified time programmed into the logic of the weighing circuitry 14.

Referring to FIG. 36, when the electronic scale 10 is powering off, an animation sequence as characterized in 40g will display on the display screen 24 informing the user that the electronic scale is powering off. This sequence includes, for example, the words "BYE BYE".

Referring to FIGS. 3H–3K, when the electronic scale 10 is calculating the weight of an object 12, the animation sequence 40h–40k will initiate. This sequence includes, for example, a graphic representation of an object falling onto a scale then resting on the scale. Thereafter, the weight of the object 12 will appear on the display screen 24 as depicted in 40j and adjacent values will oscillate in an up and down fashion 40k for a brief period of time. For example, the digits will increase and decrease in size momentarily and alternating for each place value. Then the digits will come to rest and display the weight.

Figure 3A:
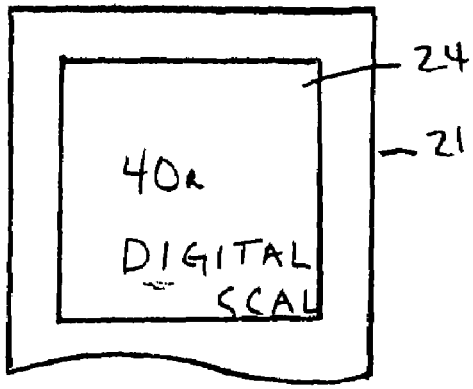
Figure 3B:
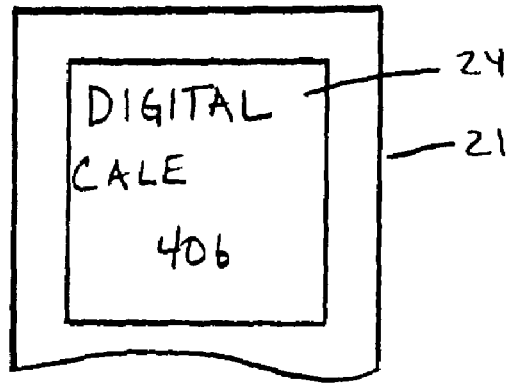
Figure 3C:
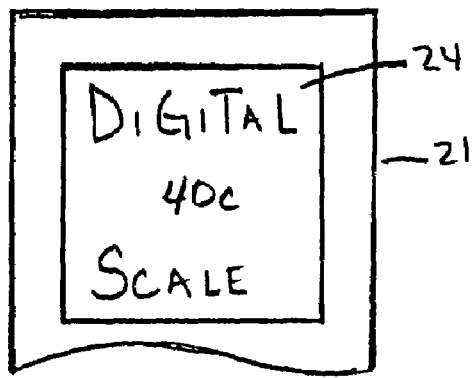
Figure 3D:
Figure 3E:
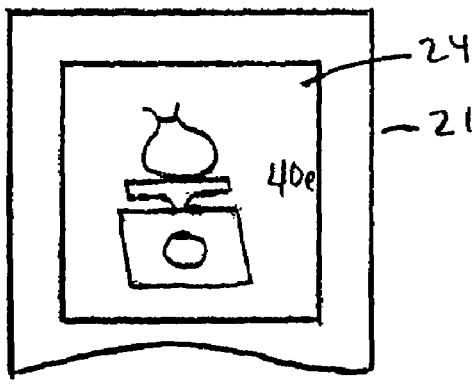
Figure 3F:
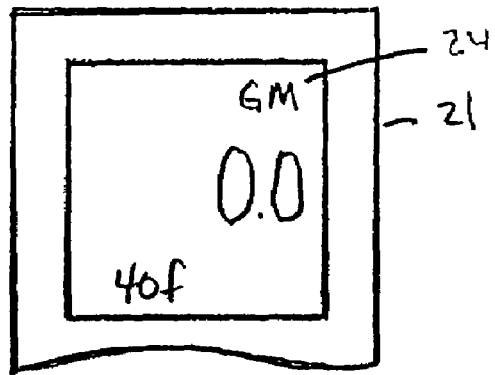
Figure 3G:
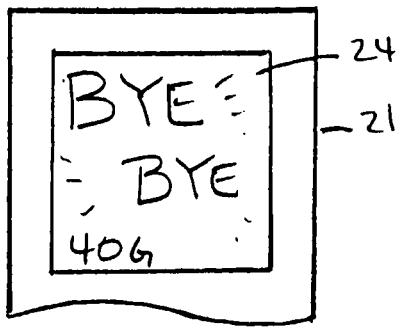
FIG. 3G depicts the display screen animation of the sample digital scale when turned off.
Figure 3H:
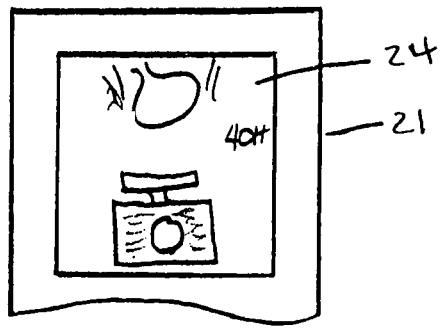
FIGS. 3H–3K depict the display screen animation of the sample digital scale when measuring the weight of an object.
Figure 3I:
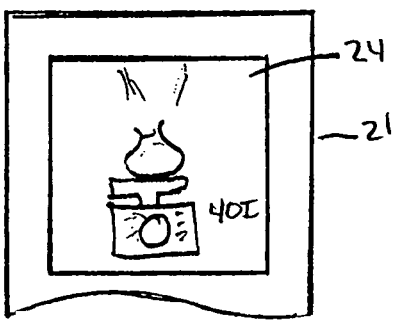
Figure 3J:
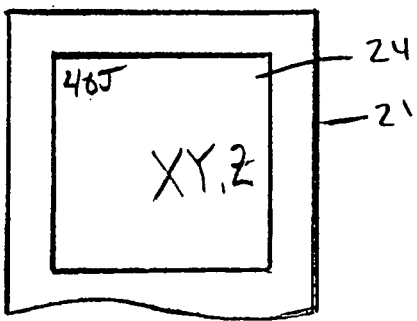
Figure 3K:
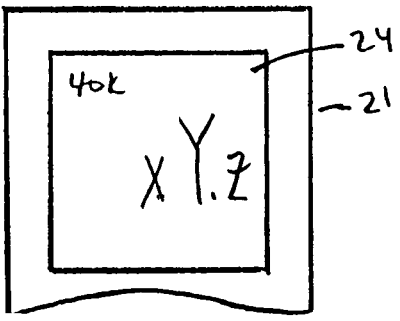
Figure 3L:
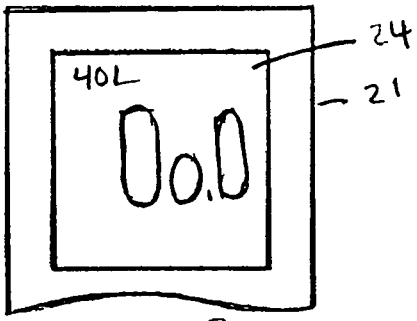
FIG. 3L depicts the display screen animation of the sample digital scale when reset.

When the scale 10 is reset, as shown in FIG. 3L, adjacent reset values will oscillate up and down 40l for a brief period of time. The display values will be uniform in size and static when the scale 10 is ready to accept an object 12 for weighing.

Figure 3M:
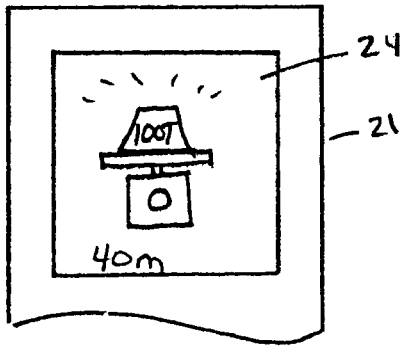
FIGS. 3M and 3N depict the animation shown on the display screen when the scale is loaded with an object weighing more than the limit of the scale.
Figure 3N:
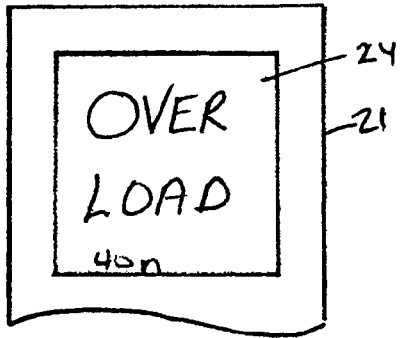

FIGS. 3M and 3N show the animation sequence 40m–40n that is viewed on the display screen 24 of the electronic scale 10 when the object placed on the weighing platform 30 is greater in weight than the handheld scale 10 is capable of weighing. For example, images 40m–40n will flash on the display screen 24 until the object is removed from the weighing platform 30. This sequence includes, for example, a large object graphical representation landing on the scale followed by the words OVERLOAD.

The operation modes of the scale 10 are controlled by a microprocessor and connected to a power source, where the operational mode includes a weighing function and several animation sequences. For example, the MODE key 34 enables the weight of the object 12 to be selectively displayed in a variety of units, including, grams, ounces, troy ounces, and pennyweight by depressing the MODE key 34.

In a method of use, the scale 10 is initially, turned on by pressing the ON key 32. After the initialization animation sequence is complete, the display 24 will read "0.0 g". Typically, the scale 10 should be allowed to warm up for at least 30 seconds before weighing for accuracy and stability. To weigh an object 12, the object 12 is placed on the center of the platform 30 and the value is shown on the display 24.

If you need to weigh loose items or anything in a container or tray, the RESET/TARE key 35 function should be used to zero the scale. There are two ways to use the TARE function: 1) turn the scale On; 2) place the empty container or tray on the platform 30; 3) press the RESET/TARE key 35, the display 24 will change to "0.0"; 4) place the objects 12 to be weighed into the container/tray; 5) the exact weight of the objects 12 will be displayed.

An alternative method for zeroing the scale 10 is to turn the scale off by depressing the OFF key 33, place the tray to be tarred onto the platform 30, then turn the scale on by depressing the ON key 32. The scale 10 will automatically tare the tray and "0.0" is displayed. A different animation sequence than shown in 40a–40f is initiated when the electronic scale 10 is turned on with an object to be tarred on the platform 30.

Another function of the scale 10 is an Auto-Off feature that turns off the scale 10 after lapses of non-activity. If the scale 10 is in a room with wind or air movement, it may sense the pressure of the air and not utilize Auto-Off. In this case, simply press the OFF key 33 to turn the scale off manually.

This scale has the ability to weigh in grams, ounces, pennyweights or troy ounces. Simply press the MODE key 34 once the scale is on. (Look for the g, oz, dwt, or ozt on the upper right of the display to determine mode).

If the battery voltage is too low during power on, it will display "Lo" for about 3 seconds and then turn off automatically. If the battery voltage becomes too low during operation, the low-batt icon will show on the screen. Replace the batteries as soon as possible. For example, use 2 CR2032 3 volt batteries.

The following demonstrates how to calibrate of the scale of the subject invention:

Simple Calibration:

It is recommended to allow the scale to warm up for 30 seconds before calibration.

(a) Turn the scale off and clear the platform.

(Make sure nothing is on the platform, not even the plastic tray)

(b) Place the scale on a flat stable surface that has NO vibrations and make sure there is absolutely NO air movement. (Surface must be extremely stable).

(c) Turn the scale on by pressing the ON key (Remember: make sure the silver platform is empty).

(d) When the display shows 0.0, Place a 100 gram weight on the center of the tray.

(e) Wait 5 seconds for the display to stabilize, then press and hold the MODE key until the display flashes 100.0 twice. (This may take about 6 seconds)

(f) Calibration is complete, release the MODE key and remove the weight from the tray.

Based on the foregoing specification, the invention may be implemented using computer programming or engineering techniques including computer software, firmware, hardware or any combination or subset thereof.

While there has been shown and described what is considered to be a preferred embodiment of the invention, it will, of course, be understood that various modifications and changes in form or detail could readily be made without departing from the spirit of the invention. It is therefore, intended that the invention not be limited to the exact form and detail herein shown and described, nor to anything less than the whole of the invention herein disclosed.

The invention claimed is:

1. An electronic scale comprising a display screen for digitally displaying the weight of an object, a processing device for controlling the scale and the display screen, wherein the display screen displays a plurality of momentary animated sequences for a user's amusement, wherein a different momentary animated sequence is respectively initiated and displayed on the display screen during each one of a plurality of functional operations of the scale, wherein each different momentary animated sequence is followed by a static screen at the completion of the respective functional operation, and wherein one of the plurality of momentary animated sequences is initiated and displayed on the display screen during the weighing of an object on the electronic scale to amuse the user until the value of the object's weight is displayed.

2. The electronic scale of claim 1 wherein said functional operations further comprise powering up.

3. The electronic scale of claim 1 wherein said functional operations further comprise changing unit of measure.

4. The electronic scale of claim 1 wherein said functional operations further comprise zero reset.

5. The electronic scale of claim 1 wherein said functional operations further comprise powering down.

6. The electronic scale of claim 1 wherein said functional operations further comprise overload error notification.

7. A method for digitally displaying the weight of an object comprising respectively initiating and momentarily displaying one of a plurality of different animated sequences for a user's amusement during a respective one of a plurality of functional operations of a scale, followed by displaying a static screen at the completion of the respective functional operation, and wherein one of the plurality of animated sequences is initiated and momentarily displayed on the display screen during the weighing of an object on the electronic scale to amuse the user until the value of the object's weight is displayed.

8. The method of claim 7 wherein said functional operations further comprise powering up.

9. The method of claim 7 wherein said functional operations further comprise changing unit of measure.

10. The method of claim 7 wherein said functional operations further comprise zero reset.

11. The method of claim 7 wherein said functional operations further comprise powering down.

12. The method of claim 7 wherein said functional operations further comprise overload error notification.

13. The method of claim 7 wherein said functional operations of weighing an object comprises displaying the weight in digits wherein said digits momentarily move prior to becoming stationary to display the weight.

14. The method of claim 13 wherein said digits momentarily move by increasing and decreasing the size of the digits in a repetitive and alternating fashion.

15. A method for digitally displaying the weight of an object comprising respectively initiating and momentarily displaying one of a plurality of different animated sequences for a user's amusement during a respective one of a plurality of functional operations of a scale, followed by displaying a static screen at the completion of the respective functional operation, and wherein one of the plurality of different animated sequences is initiated and momentarily displayed on the display screen during one or more of weighing an object, powering up, changing unit of measure, zero reset, powering down, and overload error notification to amuse the user until the functional operation is completed, and wherein an animated sequence is displayed during the functional operation of weighing an object including displaying the weight in digits wherein the digits momentarily move by increasing and decreasing the size of the digits in a repetitive and alternating fashion prior to becoming stationary to display the weight.

* * * * *